United States Patent
Giesler et al.

(10) Patent No.: US 9,721,468 B2
(45) Date of Patent: Aug. 1, 2017

(54) NAVIGATION AID FOR A MOTOR VEHICLE WITH AUTOPILOT

(71) Applicant: AUDI AG, Ingolstadt (DE)

(72) Inventors: Björn Giesler, Gaimersheim (DE); Michael Reichel, Ingolstadt (DE); Sebastian Klaas, Lenting (DE)

(73) Assignee: AUDI AG, Ingolstadt (DE)

( * ) Notice: Subject to any disclaimer, the term of this patent is extended or adjusted under 35 U.S.C. 154(b) by 11 days.

(21) Appl. No.: 14/891,207

(22) PCT Filed: Apr. 5, 2014

(86) PCT No.: PCT/EP2014/000918
§ 371 (c)(1),
(2) Date: Nov. 13, 2015

(87) PCT Pub. No.: WO2014/183822
PCT Pub. Date: Nov. 20, 2014

(65) Prior Publication Data
US 2016/0093211 A1    Mar. 31, 2016

(30) Foreign Application Priority Data
May 16, 2013   (DE) .................. 10 2013 008 605

(51) Int. Cl.
*G01C 22/00*     (2006.01)
*G05D 1/00*      (2006.01)
(Continued)

(52) U.S. Cl.
CPC ....... *G08G 1/096725* (2013.01); *B60W 50/08* (2013.01); *B60W 50/14* (2013.01);
(Continued)

(58) Field of Classification Search
None
See application file for complete search history.

(56) References Cited

U.S. PATENT DOCUMENTS 6,151,539 A    11/2000   Bergholz et al.
8,489,281 B2    7/2013   Reichel et al.
(Continued)

FOREIGN PATENT DOCUMENTS

DE    198 21 163 A1    11/1999
DE    103 45 559 A1    4/2004
(Continued)

OTHER PUBLICATIONS

International Search Report issued by the European Patent Office in International Application PCT/EP2014/000918.

*Primary Examiner* — Lail Kleinman
(74) *Attorney, Agent, or Firm* — Henry M. Feiereisen LLC.

(57) ABSTRACT

A method for operating a navigation system for a motor vehicle with autopilot is disclosed, wherein the autopilot is designed to automatically carry out longitudinal and lateral guidance of the motor vehicle in the activated state during a piloted journey without assistance from a driver. The navigation system determines, for a destination prescribed by the user, a route to the destination on the basis of navigation data. The roads on which the activation of the autopilot is likely to be possible is determined using traffic data and on the basis of a predetermined activation condition for the autopilot.

12 Claims, 1 Drawing Sheet

(51) Int. Cl.
  *G08G 1/0967* (2006.01)
  *B60W 50/08* (2012.01)
  *G01C 21/34* (2006.01)
  *G08G 1/0968* (2006.01)
  *B60W 50/14* (2012.01)
  *B60W 50/00* (2006.01)

(52) U.S. Cl.
  CPC ..... *G01C 21/3407* (2013.01); *G01C 21/3461* (2013.01); *G01C 21/3492* (2013.01); *G05D 1/0088* (2013.01); *G08G 1/096844* (2013.01); *B60W 2050/0095* (2013.01); *B60W 2550/20* (2013.01); *B60W 2550/402* (2013.01)

(56) References Cited

U.S. PATENT DOCUMENTS

| | | | |
|---|---|---|---|
| 8,606,455 | B2 | 12/2013 | Boehringer et al. |
| 8,844,968 | B2 | 9/2014 | Giesler et al. |
| 8,892,293 | B2 | 11/2014 | Reichel et al. |
| 9,008,904 | B2 | 4/2015 | Szezerba et al. |
| 9,156,497 | B2 | 10/2015 | Reichel et al. |
| 9,188,985 | B1 * | 11/2015 | Hobbs ............ G05D 1/0255 |
| 2008/0161986 | A1 | 7/2008 | Breed |
| 2012/0083964 | A1 * | 4/2012 | Montemerlo ...... G05D 1/0214 701/26 |
| 2012/0277947 | A1 * | 11/2012 | Boehringer ......... B60W 30/17 701/23 |
| 2013/0154816 | A1 | 6/2013 | Giesler et al. |
| 2013/0235200 | A1 | 9/2013 | Giesler et al. |
| 2014/0046506 | A1 | 2/2014 | Reichel et al. |
| 2015/0210216 | A1 | 7/2015 | Reichel et al. |
| 2015/0217763 | A1 | 8/2015 | Reichel et al. |
| 2015/0286219 | A1 | 10/2015 | Reichel et al. |

FOREIGN PATENT DOCUMENTS

| | | |
|---|---|---|
| DE | 10 2009 019 702 A1 | 11/2009 |
| DE | 10 2009 048 954 A1 | 4/2011 |
| DE | 10 2010 001 579 A1 | 8/2011 |
| DE | 10 2010 038 454 A1 | 2/2012 |
| DE | 10 2011 122 552 A1 | 7/2012 |
| EP | 0 913 751 A1 | 5/1999 |
| EP | 1 308 812 A2 | 5/2003 |
| EP | 2 437 129 A2 | 4/2012 |
| EP | 2 527 943 A1 | 11/2012 |

* cited by examiner

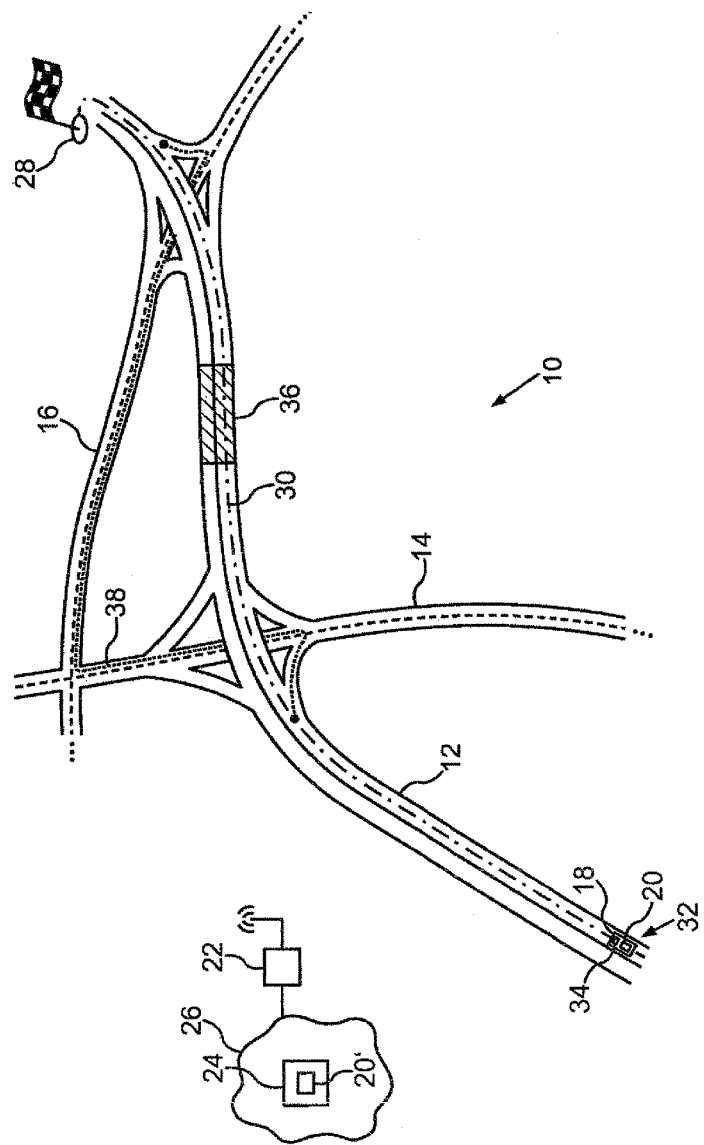

NAVIGATION AID FOR A MOTOR VEHICLE WITH AUTOPILOT

CROSS-REFERENCES TO RELATED APPLICATIONS

This application is the U.S. National Stage of International Application No. PCT/EP2014/000918, filed Apr. 5, 2014, which designated the United States and has been published as International Publication No. WO 2014/183822 and which claims the priority of German Patent Application, Serial No. 10 2013 008 605.1, filed May 16, 2013, pursuant to 35 U.S.C. 119(a)-(d).

BACKGROUND OF THE INVENTION

The invention relates to a navigation aid for a motor vehicle having an autopilot. When the autopilot is activated the autopilot can autonomously longitudinally and transversely guide the motor vehicle, i.e., accelerate and decelerate (longitudinal guiding) and steer (transverse guiding) the motor vehicle without involvement of the driver. The motor vehicle also has a navigation system for determining a driving route to a predetermined destination. The invention also includes a server arrangement for the Internet, which also has a navigation system fore the motor vehicle. Finally the invention also includes, a method for operating a navigation system.

When driving a motor vehicle nowadays, the driver typically sits at the steering wheel and at least transversely guides the motor vehicle himself. This requires the driver to concentrate on the traffic. In order to make it easier for the driver to navigate to a destination, he can use a navigation aid, i.e., a navigation system, which determines the driving route for the driver based on navigation data, which describe the street system or traffic route network. The driving route is selected so that the driver reaches his destination as fast as possible, while ideally also saving fuel. In addition to the navigation data the navigation system can also use current traffic data to select a driving route that guides the driver around regions in which he would encounter a traffic jam or slow traffic. Traffic data describe the traffic flow in the road network, for example an actual average speed.

From DE 10 2009 048 954 A1 and DE 10 2010 038 454 A1 motor vehicles with autopilots are known. An autopilot makes it possible to have the motor vehicle guided by the autopilot in certain situations for example in a traffic jam or in the case of slow traffic, i.e., to quasi have the motor vehicle drive itself. The driver in this case does not even have to monitor the automatically driving the car. He can use this time for example to write emails or to watch a movie. However, the driver is only able to activate the autopilot in the first place when the street traffic surrounding the motor vehicle allows the activation, i.e., when an activation condition for the autopilot is satisfied.

From DE 10 2009 019 702 A1 it is also known to inform the driver during a piloted drive when the autopilot recognizes that the vehicle can no longer be guided by the autopilot, because an activation condition for the autopilot is no longer satisfied. The reason for terminating a piloted drive, i.e., the deactivation of the autopilot, can for example be that a maximum speed up to which the autopilot is permitted to operate, is expected to be soon exceeded, for example at the tail end of the traffic jam.

SUMMARY OF THE INVENTION

The invention is based on the object to enable a user of a motor vehicle with autopilot to use the autopilot in a targeted or planned manner.

The object is solved by a method according to the independent method claim, a motor vehicle according to the corresponding independent claim and a server arrangement according to the corresponding further independent claim. Advantageous refinements of the invention are set forth in the dependent claims.

As described above, a predetermined activation condition for activating the autopilot has to be satisfied for using the autopilot. This predetermined activation condition depends on the model of the autopilot. When for example a certain autopilot can only be used up to a maximum speed of for example 6 km/h, a corresponding traffic situation has to be present so that the driver can activate the autopilot. If the driver would for example suddenly lower his driving speed to 6 km/h on an unobstructed highway and activate the autopilot, this would be life-threatening. A different activation situation can be that the autopilot is not permitted to perform changes of direction on a road course.

The method according to the invention relates the operation of a navigation system for a motor vehicle with autopilot. In the method a driving route to a target destination selected by a user is first determined by the navigation system in a manner known per se. According to the invention the navigation system now additionally determines based on traffic data and based on the predetermined activation condition for the autopilot on which streets activation of the autopilot is expected to be possible. The streets are of course described by the navigation data.

The method according to the invention has the advantage that the navigation system, operated according to the invention, provides the driver with a device that determines information for the driver where in the traffic network the driver can use the autopilot in a targeted manner i.e., activate the autopilot.

The invention also provides a motor vehicle, which has an autopilot, which in the activated state autonomously longitudinally and transversely guides the motor vehicle during a drive without involvement of the driver. The motor vehicle according to the invention also has a navigation system for determining a driving route to a destination determined by the driver. The driving route is determined based on navigation data in a known manner. The motor vehicle according to the invention is characterized in that the navigation system is configured to implement an embodiment of the method according to the invention. The motor vehicle according to the invention is preferably configured as automobile, in particular as passenger car.

The navigation system, however, does not necessarily have to be an onboard device of the motor vehicle itself. Another aspect of the invention relates to a vehicle-external navigation system. For this the invention provides a server arrangement for the Internet, which includes the navigation system. Also in the server arrangement according to the invention the navigation system is configured to implement an embodiment of the method according to the invention. The navigation system of the server arrangement is also configured to transmit the determined driving route to a motor vehicle.

An advantageous refinement of the method provides that the driving route is determined depending on a setting by the driver regarding the driving with activated autopilot. In other words, the navigation system does not only provide information regarding where it will be possible to activate the autopilot. Rather also the driving route is determined based on the navigation data so that a preference of the driver regarding the piloted driving is taken into account. For example the driver can determine he wants to drive in a piloted manner as frequently as possible or to drive in a piloted manner at a defined time point, for example because he expects a phone call.

Another embodiment of the method provides to output for a user of the navigation system a division of the driving route into piloted and non-piloted sections in correspondence to the determined driving route. For example the division can be displayed in a graphically processed manner on a monitor of the motor vehicle. Thus in a situation in which the driver has to drive by himself, but wants to make a telephone call, the driver can quickly recognize based on the outputted division when he will be able to continue the telephone call unimpeded. For example he can ask the other party of the phone call to call back in 10 minutes because at that point the driver can continue the drive with activated autopilot.

Of course the method according to the invention can also provide that the navigation system determines multiple driving routes and to then display the multiple driving routes to the user for selecting a desired driving route. The user can then select the desired driving route and set the desired driving route as the driving route, which is used by the navigation system during the drive as the basis for the navigation assistance.

In another embodiment the invention provides that the navigation system selects from the navigation data a driving route that satisfies a predetermined optimization criterion regarding the time the driver has to spend driving by himself. For example the optimization criterion can be that this time has to be minimized. It can also be predetermined that this time does not necessarily have to be minimized but only has to make up a defined percentage. This can be useful when further optimization criteria, for example relating to the street types to be used, are also to be taken into account.

Taking an optimization criterion into account has the advantage that the driver does not have to chose by himself between multiple possible driving routes but the selection can be made automatically based on the optimization criterion.

In another embodiment, the invention also provides that the navigation system receives information from the user regarding a latest time of arrival, i.e., the user for example inputs such a time of arrival and then a driving route is selected from the navigation data which based on the present traffic data satisfies a predetermined optimization criterion regarding the time during which the driver can drive in a piloted manner and at the same time meets the requirement of the arrival time. For example it may make more sense for a driver of a motor vehicle with autopilot to begin his drive 50 minutes before the desired time of arrival and to then spend 20 minutes in slow traffic with piloted drive than to only start his drive 40 minutes before the desired time of arrival but then having to drive 40 minutes by himself. In the first case the driver has 20 minutes to engage in activities other than driving the vehicle, in the second case only 10 minutes, i.e., the 10 minutes prior to his departure. Nevertheless, in both cases he arrives at the desired time of arrival.

In connection with a dynamic route planning, i.e., in which a driving route on which the navigation assistance is based is changed during a drive due to an unforeseen driving impediment, the invention provides in an embodiment to select from multiple possible alternatives the one that provides the most amount of free time to the driver during the drive. This embodiment results in the unusual effect compared to the state of the art that it may be more useful for a driver not to drive around the unexpected drive impediment, i.e., the traffic jam, but to intentionally drive into the traffic jam. As a result the driver can enjoy the waiting time in the traffic jam with activated autopilot as leisure time or as work time, while driving around the obstacle on a different driving route would usually require the driver to drive the motor vehicle.

In another embodiment, the invention provides that the navigation system predicts, in addition to the determined driving route, how often and how long the driver expectedly can drive uninterruptedly in a piloted manner. This helps the driver to recognize whether he can activate the autopilot only briefly or whether he can travel for a longer period of time continuously with activated autopilot. When the user doesn't like the determined driving route, for example because he would only be able to avert his attention from traffic for several short periods of time, i.e., driving in a piloted manner, he can reject the determined driving route and initiate the determination of an alternative driving route.

The decision for a certain driving route is made particularly easy for the user of the navigation system in an embodiment of the invention in which the navigation system, in addition to the determined driving route, predicts for the driver how much of a certain text he will be able to read or how much of a certain movie he will be able to watch. Hereby for example a parameter regarding the reading speed of the driver may be stored in the navigation system. Then the following can for example be displayed to the user: "you can watch about half of the movie XY on the drive along the driving route".

It was found that the piloted drive can have various qualities. According to an embodiment, the invention therefore provides that the navigation system assigns a traffic jam described by the traffic data to one of multiple traffic jam types and to recommend to the driver a side occupation the driver can engage in during a piloted drive in the traffic jam. Traffic jam types can for example be: stationary, flowing, slowly flowing, stop and go. In stop and go traffic with many speed changes a nap makes for example less sense than during stationary traffic.

In another embodiment, the invention provides a speed recommendation, which is given by the navigation system for a driving route before a traffic jam on the driving route. In addition or as an alternative, a predicted time of arrival at the traffic jam can also be outputted. In this case the driver can influence in a targeted manner when he wants to drive in a piloted manner, i.e., by adjusting the driving speed. By driving at a correspondingly high speed, the start of the piloted drive can be achieved earlier.

Preferably a speed recommendation is generated depending on an appointment the driver has and/or an optimization criterion that the driver is to drive with activated autopilot as long as possible. When the driver for example has planned a phone call for 2:00 pm, the navigation system can support the driver by recommending corresponding speeds, so that the driver arrives at the traffic jam at that time and the piloted drive has begun. The speed recommendation also enables shortening road sections in which the driver actively has to steer by himself.

In another embodiment the invention provides that the navigation system generates a message in dependence on the activation state of the autopilot to inform a person outside the motor vehicle. When the driver is for example active in a social network and likes to upload personal statuses for example via Facebook, this an be supported in that the status of the piloted/assisted driving is automatically posted, for example as: "I'm currently being driven by the vehicle and watching a movie". As a result of the message the informed person can for example call the driver knowing that the call will not distract the driver from driving the motor vehicle. A message can therefore also be: "You can now call me!" or "I will now receive calls".

In another embodiment the invention provides that the navigation system receives appointment data form an electronic calendar of the driver and to plan the driving route so that the autopilot is active at at least one appointment defined by the appointment data. Then the driver is not distracted by driving the car at this appointment.

BRIEF DESCRIPTION OF THE DRAWING

In the following the invention is again explained by way of a concrete exemplary embodiment. For this the sole FIGURE exemplary shows a schematic illustration of a traffic network 10 with a highway 12 and two country roads 14, 16.

DETAILED DESCRIPTION OF PREFERRED EMBODIMENTS

In the exemplary embodiment explained below, the described components represent respectively individual features of the invention, which are to be regarded independent of each other, which refined the invention independent of each other and with this can also be regarded as part of the invention either individually or in combinations different from the one shown. The described embodiments can also be modified by adding further described features of the invention.

In the example shown in the FIGURE a motor vehicle 18 drives on the highway 12. This can be an embodiment of the motor vehicle according to the invention. For example the motor vehicle can be a motor vehicle, in particular a passenger car. In the motor vehicle 18 a navigation system 20 can be present. In addition or as an alternative the motor vehicle 10 can be configured to communicate wirelessly, for example via a mobile network, via a communication network 22 for example a mobile radio network with a server arrangement 24 of the internet 26. The server arrangement 24 can then have a navigation device 20'. The functionalities provided by the navigation system 20 and the navigation system 20' can be the same. In the following it is therefore assumed that the motor vehicle 18 is an embodiment of the motor vehicle according to the invention with an own navigation system 20.

A (not shown) driver of the motor vehicle 18 has set a destination 28 as navigation destination in the navigation system 20. Thereupon the navigation system 20 has determined a driving route 30 to the destination 28 starting from a present location 32 of the motor vehicle 18. In the shown example the present location 32 can be the starting point of the drive of the motor vehicle 18 or a present position during a drive. In the second case the route planning is a dynamic route planning. The driving route 30 may have been determined by the navigation system 20 on the basis of navigation data regarding the traffic network 10. The navigation data can for example be stored in a navigation database of the navigation system 20. The motor vehicle 18 can additionally receive actual traffic data regarding the traffic flow in the road traffic network 10.

The motor vehicle 18 has an autopilot 34, which can drive the motor vehicle 18. The autopilot 34 can thus longitudinally and transversely guide the motor vehicle 18 independent of the driver, when the autopilot 34 is activated. In the deactivated state of the autopilot 34 the driver has to perform at least the transverse guidance of the motor vehicle 18.

The navigation system 20 takes the autopilot 34 into account during the route planning: The navigation system 20 tests based on the actual traffic data where in the traffic network 10 an activation condition for the autopilot 34 is satisfied, where for example the traffic flow has such a low driving speed that the motor vehicle 18 can be driven by the autopilot 34. In the shown example the traffic data indicate the presence of a traffic jam 36 on the highway 12, in which the activation condition is satisfied, i.e., the motor vehicle can be driven in a piloted manner by the autopilot 34. The piloted drive through the traffic jam 36, however, would extend the overall travel time to the destination 28. The navigation system 20 therefore calculates an alternative route 38, which in the shown example leads over the two country roads 14, 16. The navigation system 20 tests how long the drive would take on the originally planned route 30 if driving through the traffic jam 36. Hereby the navigation system takes into account, however, that in the traffic jam 36 the driver does not have to guide the motor vehicle 18 himself but can for example read emails or watch a movie. For the alternative route 38 it is also determined how long the driver would need to reach the destination 28 starting from the present location 32. Herby it is taken into account that the driver has to drive the motor vehicle 18 himself the entire time on the alternative route 38. For example the navigation system can determine that the drive on the originally planned route 20 overall takes 50 minutes, while on the alternative route 38 it only takes 40 minutes. The driver would thus arrive 10 minutes earlier at the destination. Thus based on conventional evaluation rules, the navigation system 20 would have to plan the route so as to navigate the motor vehicle 18 along the alternative route 38, i.e., provide navigation information to the driver for this route.

However, the navigation system 20 also determines that the time spent in the traffic jam 36 will for example be 20 minutes. The driver thus arrives 10 minutes later at the destination 28, however, he was able to engage in other activities for 20 minutes during piloted drive, such as reading emails. The navigation system evaluates this to be a time saving for the driver when deciding between the original driving route 30 and the alternative driving route 38. Therefore the navigation system 20 maintains the original driving route, i.e., it does not change the drive route and guides the driver along the drive route 30 into the traffic jam 36. There, the driver can activate the autopilot without risk and engage in activities different from driving the motor vehicle 18.

The navigation system 20 and correspondingly the navigation system 20' can still have other functionalities. These are summarized exemplary below.

The possibility for piloted driving can already be taken into account when planning the route. Thus optimization can be performed based on the time the driver has to drive by himself. Also a latest time of arrival can be predetermined and it can be optimized regarding the amount of time the driver can drive in a piloted manner. In the dynamic route planning it can also be optimized according to how much time/work time the driver gains as a result of the piloted driving. The planned route can be displayed to the driver in a graphically processed manner by taking into account the piloted/non-piloted phases; This can be especially interesting for technology enthusiasts and playful customers. By way of the graphical processing it can also be decided whether the piloted phases are interrupted, relatively short time periods or relatively long phases. Correspondingly the driver can prepare for the drive for example by bringing a book or by planning to read emails. The amount of time the driver can uninterruptedly drive in a piloted manner can also be predicted for the driver. Thereafter the driver can decide whether it is worthwhile to start watching a movie or to write a relatively short email. This information can also be prepared for the driver so as to predict for the driver how much of a text he can read or how much of a movie he can watch relative to the entire work (book or movie). A traffic jam can be divided into different types (for example stationary, flowing, stop and go). Based on the predicted type of traffic jam, a side activity can be recommended to the driver. From the predicted traffic jam data along a route, the driver can also be given a speed recommendation for the route leading up to the traffic jam: he can thus decide when to drive in a piloted manner and has time for a certain E-mail/video phone call. The driver can decide whether he wants to drive so as to be able to drive in the piloted mode as long as possible. When the driver is active in the social network this can be supported by automatically posting the status of the piloted driving.

For realizing the functionalities of the navigation system 20 or 20' according to the invention the Star-algorithm, which is known per se, can be used for the route planning, which determines certain optimizations (shortest driving route, fastest driving route based on navigation data) via cost/yield of partial routes. By means of actual traffic jam reports and predicted traffic jams, or generally traffic data, costs and yields for the piloted/non-piloted drive can also be given. Thus these new properties of a motor vehicle can be taken into account in the route planning. Traffic data can for example be retrieved from data sources such as "Google Live Traffic/Traffic Forecast". Also predictions for the actual traffic jam and the predicted time of use of the autopilot can be derived from these data. In connection with the use of an autopilot during drives in traffic jams, an autopilot is also referred to as traffic jam pilot.

What is claimed is:

1. A method for operating a navigation system for a motor vehicle with autopilot, wherein the autopilot is configured in an activated state to autonomously perform a longitudinal and transverse guiding of the motor vehicle during a piloted drive without involvement of a driver, the method comprising:
   determining with the navigation system based on navigation data a driving route to a destination;
   determining with the navigation system based on traffic data and based on a predetermined activation condition for activation of the autopilot on which streets described by the navigation data the activation of the autopilot is expected to be possible;
   assigning with the navigation system a traffic jam present on the determined driving route and described by the traffic data to one of multiple traffic jam types and providing with the navigation system a recommendation for a side activity to the driver during a piloted drive in the traffic jam; and
   outputting with the navigation system a speed recommendation for a road section before a traffic lam present on the driving route or outputting a predicted time of arrival at the traffic jam, wherein the speed recommendation is generated as a function of an appointment of the driver and/or as a function of a maximum amount of time the driver is able to drive with activated autopilot.

2. The method of claim 1, further comprising dividing the driving route into sections of piloted and non-piloted driving and displaying the sections to the user of the navigation system.

3. The method of claim 1, wherein the driving route is determined with the navigation system so that under traffic conditions defined by the traffic data the driving route satisfies a predetermined optimization criterion regarding a time the driver has to drive by himself.

4. The method of claim 1, further comprising selecting during the drive of the motor vehicle with a dynamic route planning from multiple alternative driving routes a driving route which provides a maximum of free time to the driver during the drive and/or during a predetermined time period as a result of piloted driving on the selected driving route.

5. The method of claim 1, further comprising predicting with the navigation system for the driver an amount of time the driver can drive on the determined driving route uninterruptedly in a piloted manner.

6. The method of claim 1, further comprising predicting with the navigation system for the driver how much of a given text the drive can read or how much of a given movie the driver can watch when driving on the determined driving route.

7. The method of claim 1, further comprising graphically displaying piloted and non-piloted phases of a drive on the determined driving route so as to indicate whether the piloted phases are interrupted piloted phases, relatively short time periods or relatively long time periods.

8. The method of claim 1, wherein the driving route is determined as a function of a request by the driver regarding driving with activated autopilot.

9. The method of claim 1, further comprising generating a message with the navigation system in dependence on a state of activation of the autopilot for informing a person outside the motor vehicle, wherein a status of the piloted driving is automatically posted in a social network.

10. The method of claim 1, further comprising receiving with the navigation system appointment data from an electronic calendar of the driver, and determining with the navigation system the driving route so that the autopilot is active at a time of at least one appointment described by the appointment data.

11. A motor vehicle, comprising:
   an autopilot and a navigation system, said autopilot being configured in an activated state to perform an autonomous transverse and longitudinal guiding of the motor vehicle during a drive without involvement of a driver, said navigation system being configured to:
   determine based on navigation data a driving route to a destination,
   determine based on traffic data and based on a predetermined activation condition for activation of the autopilot on which streets described by the navigation data the activation of the autopilot is expected to be possible,
   assign a traffic jam present on the determined driving route and described by the traffic data to one of multiple traffic jam types,
   provide a recommendation for a side activity for the driver to engage in during a piloted drive in the traffic jam, and
   output with the navigation system a speed recommendation for a road section before a traffic jam present on the driving route or outputting a predicted time of arrival at the traffic jam, wherein the speed recommendation is generated as a function of an appointment of the driver and/or as a function of a maximum amount of time the driver is able to drive with activated autopilot.

12. A server arrangement for the Internet, comprising:

a navigation system, said navigation system being configured to determine based on navigation data a driving route to a destination selected by a driver of a motor vehicle, transmit the determined driving route to the motor vehicle, determine based on traffic data and based on a predetermined activation condition for activation of the autopilot on which streets described by the navigation data the activation of the autopilot is expected to be possible, assign a traffic jam present on the determined driving route and described by the traffic data to one of multiple traffic jam types, provide a recommendation for a side activity for the driver to engage in during a piloted drive in the traffic jam, and output with the navigation system a speed recommendation for a road section before a traffic jam present on the driving route or outputting a predicted time of arrival at the traffic jam, wherein the speed recommendation is generated as a function of an appointment of the driver and/or as a function of a maximum amount of time the driver is able to drive with activated autopilot.

\* \* \* \* \*